United States Patent [19]

Michel

[11] 3,783,838

[45] Jan. 8, 1974

[54] STEAM GENERATOR FOR PRESSURIZED WATER NUCLEAR REACTORS

[75] Inventor: Eberhard Michel, Boxdorf, Germany

[73] Assignee: Siemens Aktiengesellschaft, Munich, Germany

[22] Filed: June 9, 1972

[21] Appl. No.: 261,249

[30] Foreign Application Priority Data
June 11, 1971 Germany.................. P 21 28 879.9

[52] U.S. Cl.................................. 122/34, 122/483
[51] Int. Cl............................................. F22b 1/06
[58] Field of Search....................... 122/32, 34, 483

[56] References Cited
UNITED STATES PATENTS

| | | | |
|---|---|---|---|
| 3,262,428 | 7/1966 | Romanos............................. | 122/34 |
| 3,286,696 | 11/1966 | Green et al........................... | 122/34 |
| 3,298,358 | 1/1967 | Alden, Jr............................. | 122/34 |

Primary Examiner—Kenneth W. Sprague
Attorney—Kenyon & Kenyon Reilly Carr & Chapin

[57] ABSTRACT

A steam generator for pressurized water nuclear reactors has an upright U-tube bundle of heating surface members. A cylindrical hollow chamber is provided at the center of the U-tube bundle and serves as preseparator for a steam-water mixture supplied tangentially to the chamber from a region of the U-tube bundle which contains the vertically extending legs, whereby water is separated from the steam-water mixture and flows downwardly while steam containing remnant moisture entrained therein flows upwardly from the hollow chamber. A fine separator is diposed between a portion of the U-tube bundle and the hollow chamber and separates the remnant moisture from the upwardly flowing steam to produce purified steam. The steam then passes through the above-mentioned portion of the U-tube bundle with the remnant moisture removed thereby providing increased superheating of the steam.

1 Claim, 2 Drawing Figures

STEAM GENERATOR FOR PRESSURIZED WATER NUCLEAR REACTORS

BACKGROUND OF THE INVENTION

This invention relates to a steam generator for pressurized water nuclear reactors. More particularly, the invention relates to a steam generator for obtaining a higher super-heating of steam and is an improvement over the steam generator disclosed in the earlier U.S. patent application, Ser. No. 117,551, filed on Feb. 22, 1971 with the title: Steam Generator for Pressurized Water Nuclear Reactor.

The above-identified earlier patent application discloses a steam generator for pressurized nuclear reactors having an upright U-tube bundle of heating surfaces which conduct the primary medium and wherein a secondary medium flows upwardly along and between the tubes of the U-tube bundle and vaporizes at least in part to form a steam-water mixture. A cylindrical hollow chamber is provided at the center of the U-tube bundle and serves as preseparator and fallspace for the steam-water mixture which is supplied tangentially thereto from the vicinity of the vertically extending legs of the U-tube bundle.

SUMMARY OF THE INVENTION

It is an object of the invention to obtain a higher super-heating of the steam generated in the above-mentioned steam generator.

In the hollow chamber located in the center of the U-tube heating surface bundle, water is separated from the steam-water mixture and flows downwardly while steam containing remnant moisture entrained therein flows upwardly from the hollow chamber.

According to a feature of the invention, a fine separator is disposed between a portion of the U-tube heating surface bundle and the hollow chamber for separating the remnant moisture from the upwardly flowing steam to produce purified or dried steam. In this way, the steam flowing from the hollow chamber that serves as a preseparator passes through the fine separator and then passes through a portion of the U-tube bundle adjacent the separator.

The steam which leaves the preseparator still contains remnants of moisture. In the fine separator of the instant invention, this remnant moisture is separated. Therefore, the steam flowing through the remaining heating surfaces is dried to a great extent and a higher super-heating of the steam is obtained.

Although the invention is illustrated and described herein as a steam generator for pressurized water nuclear reactors, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

The preferred embodiment of the steam generator according to the invention is illustrated in the two FIGS. described below. Similar or like components are designated by the same reference numeral in each FIG. in which they appear.

DESCRIPTION OF THE PREFERRED EMBODIMENT

Figure 1:
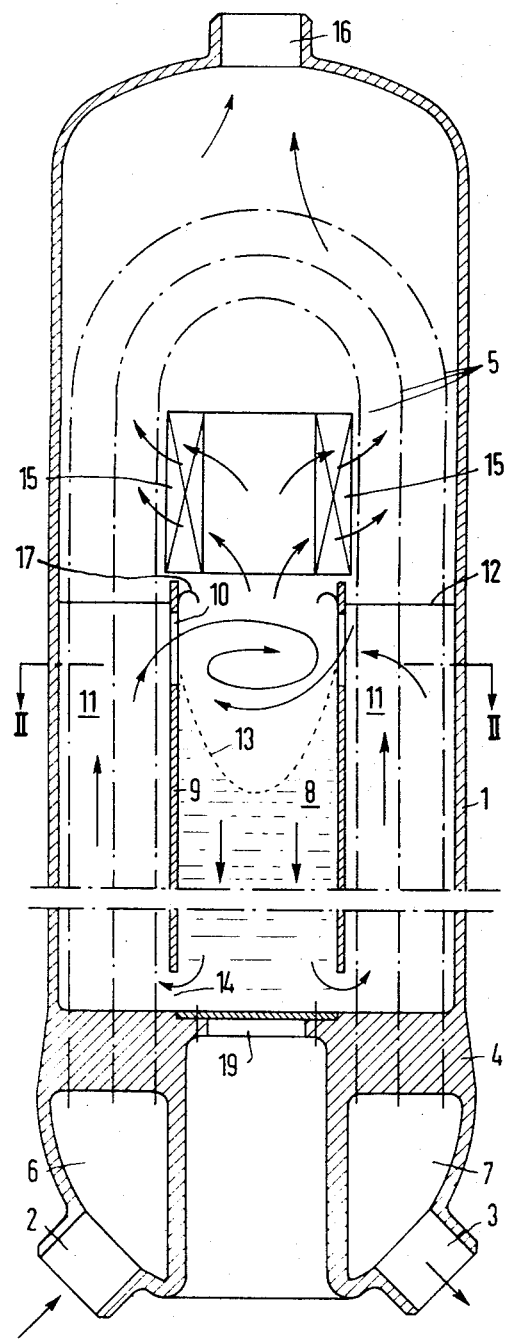
FIG. 1 is a diagrammatic longitudinal sectional view of a steam generator equipped with a fine separator as required by the invention.

Referring to FIG. 1, the steam generator includes a cylindrical casing 1 having a supply stub 2 and a discharge stub 3 for a primary medium. A U-tube bundle 5 is mounted in a conventional manner on the tube floor 4 located in a lower region of the casing 1. The primary medium flows in through the supply stub 2 and a supply chamber 6 traverses the U-tube bundle 5 and discharges through the outlet chamber 7 and the stub 3. A secondary medium, which is water in the case at hand, flows upwardly from below about and around the U-tube bundle 5, a portion thereof being vaporized in the process.

A cylindrical hollow chamber 8 is provided in the center of the U-tube bundle 5, the chamber being defined by a cylindrical guide jacket 9. The guide jacket 9 extends from the vicinity of the tube floor 4 up to about the end of the vertically extending straight leg portions of the U-tube bundle 5. In the upper region of the guide jacket 9 substantially tangentially extending inlet slits 10 are formed, as shown more clearly in the cross-sectional view of FIG. 2.

An annular space defined by the guide jacket 9 and the outer casing 1 of the steam generator, wherein the vertically extending legs of the U-tube bundle 5 are disposed, forms the riser space 11 proper for the vaporizing water. The riser space 11 is close at a location above the substantially tangential inlet slits 10 by a horizontally disposed baffle or deflecting plate 12 so that the steam-water mixture rising in the riser space 11 is conducted inwardly through the inlet slits 10 into the hollow space 8 acting as preseparator. Due to the high inlet velocity of the steam-water mixture, an intense rotation occurs in the hollow chamber 8 which effects separation of the water and steam. The boundary line between the separated water and onwardly flowing steam is identified by the dotted line 13. Because of its high specific weight, the separated water flows downwardly while the steam is pulled upwardly. The separated water flows out of the hollow chamber 8 through outlet slits 14 formed at the lower end of the guide jacket 9. The secondary medium, namely feedwater, is introduced through the stubs 20a and 20b into the fallspace located below the preseparator, intermixes thereat with the separated and downwardly flowing water and carries out natural circulation due to the fact that the specific weight thereof is greater than that of the water-steam mixture.

The steam flowing upwardly from the preseparator is passed through a fine separator 15 which is also arranged in the center of the U-tube bundle 5, above the cylindrical guide jacket 9. As a fine separator 15, an impingement-type separator can be used. After passing through the fine separator 15, the steam flows through a portion of the U-tube bundle 5 and flows off through a steam outlet 16 located in the dome of the steam generator. From here the steam can be supplied to the turbines (not illustrated). The steam flowing off from the preseparator chamber 8 still possesses remnant moisture. In the fine separator 15 disposed behind the chamber 8, steam is then purified of the remnant moisture. The purified steam is dried steam and is heated during its passage through the remaining heating surface means, which in the illustrated embodiment comprises the curved part of U-tube bundle 5 and a portion of the vertically extending straight leg parts thereof. The heating can be increased by means of guide plates which can be mounted in the region of the U-tube bundle 5 traversed by the dried steam. This configuration provides a higher degree of heating for the dried steam as compared to an arrangement which lacks a fine separator 15 as herein disclosed and where the outflowing steam is dried by passing it through the tube turn of the U-tube bundle 5.

To prevent water flowing through the inlet slits 10 from being entrained in an upward direction by the steam, there are provided collecting or capture troughs 17 which open downwardly. The troughs 17 are mounted at the upper end and at the inner surface of the guide jacket 9 and serve to hold back the water and direct it downwardly.

Figure 2:
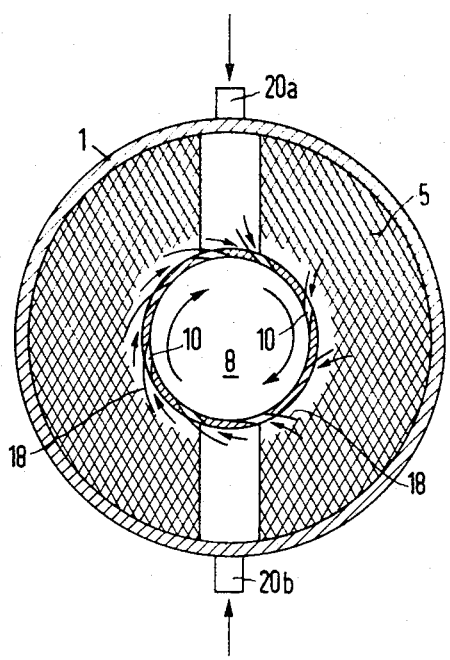
FIG. 2 is a cross-sectional view of FIG. 1 taken along the line II—II.

Referring to FIG. 2, the inlet slits 10 can be provided with guide plates 18 at the outer surface of the guide jacket 9 which serve for improved feeding of the steam-water mixture.

By means of the cylindrical fallspace within the U-tube bundle 5, it is possible to provide additionally in the center of the tube floor or plate 4, a manhole 19 which permits access to the chamber during the manufacture and also for subsequent inspection thereof.

What is claimed is:

1. A steam generator for pressurized water nuclear reactors comprising an upright U-tube heating surface bundle traversible by a primary medium flow, means for conducting a secondary medium upwardly along and between the tubes of said U-tube heating surface bundle so as to vaporize at least part of said secondary medium and form a steam-water mixture in the vicinity of the vertically extending legs of said U-tube heating surface bundle, a cylindrical hollow chamber located in the center of said U-tube heating surface bundle serving as a fallspace and preseparator for the steam-water mixture, and means for supplying the steam-water mixture to said hollow chamber from the vicinity of said vertically extending legs of said U-tube heating surface bundle in a direction substantially tangential to said hollow chamber, whereby water is separated from the steam-water mixture and flows downwardly while steam containing remnant moisture entrained therein flows upwardly from said hollow chamber, a fine separator disposed between a portion of said U-tube heating surface bundle and said hollow chamber for separating the remnant moisture from the upwardly flowing steam to produce purified steam, and means for directing the purified steam to said portion of said U-tube heating surface bundle, whereby the purified steam flows upwardly through said portion.

* * * * *